United States Patent [19]

Inoue et al.

[11] Patent Number: 5,945,083

[45] Date of Patent: Aug. 31, 1999

[54] PROCESS FOR PRODUCING IRON CARBIDE AND EQUIPMENT THEREFOR

[75] Inventors: Eiji Inoue, Kobe; Yoshio Uchiyama, Akashi; Junya Nakatani, Kobe, all of Japan

[73] Assignees: Kawasaki Jukogyo Kabushiki Kaisha; Mitsubishi Corporation, both of Japan

[21] Appl. No.: 08/896,293

[22] Filed: Jul. 7, 1997

Related U.S. Application Data

[63] Continuation of application No. PCT/JP96/00608, Mar. 11, 1996.

[30] Foreign Application Priority Data

Mar. 10, 1995 [JP] Japan ........................................ 7-51086

[51] Int. Cl.$^6$ .................................................... C01B 31/30
[52] U.S. Cl. ............................................................ 423/439
[58] Field of Search ...................................... 423/439, 440

[56] References Cited

U.S. PATENT DOCUMENTS 3,885,023  5/1975  Gray et al. ............................... 423/439
5,137,566  8/1992  Stephen, Jr. et al. ..................... 75/507
5,387,274  2/1995  Dam G. et al. ........................... 75/495

FOREIGN PATENT DOCUMENTS 52-886      11/1977   Japan .
6-501983    of 1994   Japan .
WO96/28381  9/1996    Japan .
1310050     3/1973    United Kingdom .

OTHER PUBLICATIONS

Intl Search Report "WO96/28381" Listing Documents "AA" Through "AB" and "AM" Through "AP" (9/19/96).

*Primary Examiner*—Michael Lewis
*Assistant Examiner*—Stuart L. Hendrickson
*Attorney, Agent, or Firm*—Oppenheimer, Wolff & Donnelly

[57] ABSTRACT

Powdered ore is fed into fluidized bed reactor 1 after preheating by hot blast in preheating furnace 2. Iron oxide particles are recovered from an exhaust gas of the preheating furnace 2 by dust catcher 3, and the iron oxide particles are reduced to iron in reducing furnace 4. The reduced iron particles are added into the flow path of fluidized bed reactor 1 to catalyze the reaction producing iron carbide.

4 Claims, 3 Drawing Sheets

PROCESS FOR PRODUCING IRON CARBIDE AND EQUIPMENT THEREFOR

This application is a continuation of PCT/JP96/00608, filed Mar. 4, 1995.

TECHNICAL FIELD

This invention relates to a process for producing iron carbide from iron oxide, such as hematite and an equipment therefor.

BACKGROUND ART

A prior art method of producing particles of iron carbide ($Fe_3C$) by feeding particles of hematite ($Fe_2O_3$) into a fluidized bed reactor, while fluidizing said particles by a reaction gas, is disclosed, for example, in Publications of the Translation of International Patent Application No.6-501983 (PCT/US91/05198). In this prior art, preheated particles of iron ore are fed into a fluidized bed reactor and carburized by a reaction gas containing carbon monoxide (CO), or the like, to produce particles of iron carbide, such as cementite ($Fe_3C$). An efficient conversion of iron ore containing a high iron oxide content, such as hematite, into iron carbide would become a major technique for extracting iron from iron ore because iron carbide can be used directly as a source of iron in steel making furnaces, such as electric furnaces.

FIG. 6 illustrates the change of the reaction composition with increasing reaction time as shown in the FIG. 8 of Publications of the Translation of the International Patent Application No.6-501983. The iron oxide fed at the time 0, which contains about 60 percent of $Fe_3O_4$ and about 40 percent of $Fe_2O_3$, is converted into iron carbide ($Fe_3C$). However, the production rate of iron carbide is remarkably slower in the latter part of the reaction (i.e., after 4 to 6 hours). It is recognized that a longer reaction time would be required to reduce iron oxide, such as $Fe_3O_4$ and FeO, and obtain iron carbide ($Fe_3C$) at a high conversion ratio. In a fluidized bed reactor, a long passage, i.e., flow path, is required in order to achieve a long residence time of particles in the reactor, and the section area of the flow path has to be increased to obtain a large quantity of iron carbide. Accordingly, a large-scale fluidized bed reactor must be installed in order to obtain a large quantity of iron carbide at a high conversion ratio.

The present invention is intended to increase the production rate of iron carbide in the latter part of the reaction, and thereby provide a process for efficiently producing iron carbide and an equipment therefor without increasing the size of the fluidized bed reactor.

DISCLOSURE OF INVENTION

In accordance with one aspect of the invention, a process for producing iron carbide is provided, wherein particles of iron oxide are fed into a fluidized bed reactor, and said particles are carburized while said particles are fluidized by reaction gas, and wherein particles of iron (Fe) are added into the middle of the passage, or flow path, of said fed particles of iron oxide, or downstream therefrom.

In accordance with another aspect of the invention, iron oxide particles are fed into the fluidized bed reactor, and iron particles are introduced along the flow path in which said iron oxide particles converted into iron carbide. The iron particles act as a catalyst for decomposition of carbon monoxide (CO) contained in a reaction gas to promote the following reaction:

$$2CO \rightarrow C + CO_2,$$

which promotes the conversion from iron oxide to iron carbide. The production rate of iron carbide then can be increased by introducing iron particles to the latter part of the reaction as a catalyst.

In accordance with another aspect of the invention, said iron particles are added at a plurality of locations along the length of said passage, or flow path, and the diameter of said iron particles added at the relatively downstream side of said passage is smaller than the diameter of iron particles added at the relatively upstream side of said passage.

In accordance with another aspect of the invention, iron particles are added at a plurality of locations along the length of the flow path, or passage, in the fluidized bed reactor. Because the diameter of the iron particles added into the relatively downstream side of the passage is smaller than the diameter of the iron particles added into the relatively upstream side, all the iron particles are able to act as a catalyst, be readily converted into iron carbide in the short time before reaching the end of the flow path.

According to another aspect of the invention, iron oxide particles are recovered from an exhaust gas from preheating of said iron oxide particles, and iron particles are produced therefrom by reduction.

In accordance with another aspect of the invention, iron oxide particles are recovered from an exhaust gas generated from preheating of iron oxide particles to be fed into the fluidized bed reactor. The recovered iron oxide particles are reduced to produce iron particles that are added to the middle of the flow path, or downstream from the middle of the flow path, of the fluidized bed reactor. The iron oxide particles exhausted with the exhaust gas in preheating step are small in diameter than the iron oxide particles fed into the fluidized bed reactor. Because minute particles of reduced iron oxide are added into the middle of the passage, or flow path (and downstream therefrom), they are able to act effectively as a catalyst, even in a short time period, and then be converted into iron carbide.

In accordance with another aspect of the invention, an equipment for producing iron carbide by feeding iron oxide particles into a fluidized bed reactor, and carburizing said particles while fluidizing said particles by reaction gas is provided. The equipment comprises a preheating means for preheating said iron oxide particles by hot blast, a recovering means for recovering said iron oxide particles from an exhaust gas from the preheating means, and a reducing means for reducing said iron oxide particles recovered by said recovering means and for adding said reduced particles into said fluidized bed reactor.

In accordance with the another aspect of the invention, the iron oxide particles preheated by the preheating means are fed into a fluidized bed reactor to produce iron carbide. From the exhaust gas exiting the preheating means, iron oxide particles are recovered by a recovering means and reduced by a reducing means for introduction into the fluidized bed reactor. The iron oxide particles recovered from the exhaust gas are smaller in diameter than the preheated iron oxide particles that are fed into the fluidized bed reactor. Therefore, the iron oxide particles that are reduced by reducing means prior to addition into the flow path of the fluidized bed reactor are smaller in diameter than the iron oxide particles reacting in the fluidized bed reactor. Accordingly, the iron particles can themselves be converted into iron carbide after acting as a catalyst to accelerate the reaction for converting iron oxide into iron carbide.

In accordance with another aspect of the invention, a classifying means for classifying the reduced particles of iron oxide, i.e., iron particles, into a plurality of classes according to the diameter of said reduced particles is provided between said reducing means and said fluidized bed reactor, and thereby said reduced particles are added at a plurality of locations at middle of the flow path, and downstream therefrom, of said iron oxide particles fed into the fluidized bed reactor, such that the class of iron particles added at the relatively downstream side of the flow path are of a smaller diameter than the iron particles added at the relatively upstream side of the flow path.

In accordance with the another aspect of the invention, iron particles produced by the reducing means are classified into a plurality of classes by classifying means. The iron particles are classified by the diameter of the particles. The reduced particles are added at a plurality of locations at the middle of the passage of the fluidized bed reactor, and downstream therefrom, such that the iron particles added at the relatively downstream side of the flow path have a smaller diameter class than the iron particles added at the relatively upstream side. The class of iron particles having a smaller diameter are able to act effectively as a catalyst even in a short period, then be converted into iron carbide after increasing the rate of producing iron carbide from iron oxide.

As set forth hereinabove, in accordance with the present invention, the rate of producing iron carbide from iron oxide can be increased by adding iron particles as a catalyst to the fluidized bed reactor at the latter stage of the reaction. Reducing the time required to obtain iron carbide improves production efficiency and allows the miniaturization of equipment, such as the fluidized bed reactor.

In accordance with the invention, the diameter of the iron particles added to the relatively downstream side of the fluidized bed reactor is smaller than the diameter of the iron particles added into the relatively upstream side of the reactor. Therefore, the production rate of iron carbide can be increased effectively, even in the short time between adding the iron particles to the reaction and the end of the flow path.

In accordance with the invention, the iron oxide particles present in the exhaust gas from preheating the iron oxide particles are recovered and reduced for addition into the flow path of the fluidized bed reactor as iron particles. The iron oxide particles recovered from the exhaust gas are smaller in diameter than the iron oxide particles fed into the fluidized bed reactor as a starting material. Because iron particles are smaller in diameter than the iron oxide particles, the iron particles, which are added to the reactor immediately after reduction, can effectively increase the reaction rate of producing iron carbide.

In accordance with the invention, a recovering means recovers iron oxide particles from the exhaust gas generated after the preheating means preheats the iron oxide particles by a hot blast of gas. The recovered iron oxide particles are reduced to iron by a reducing means for addition of iron particles into the fluidized bed reactor. The preheated iron oxide particles are fed into the fluidized bed reactor and carburized while flowing along the passage, or flow path, thereby making iron carbide. By adding the iron particles into the flow path, the catalytic action of the iron particles promotes the carburizing reaction and increases the production rate of iron carbide. Thus, the time required for producing iron carbide is shortened, and a large quantity of iron carbide can be produced even by a relatively small-size fluidized bed reactor.

In accordance with the invention, the iron particles are classified by classifying means which is positioned between and operatively connected to the reducing means and the fluidized bed reactor. The class of iron particles having a smaller diameter are added to the fluifized bed reactor at a relatively downstream side of the flow path so that the iron particles can effectively promote, or catalyze, the carburizing reaction and be converted into iron carbide in a short time.

BEST MODE FOR CARRYING OUT THE INVENTION

Figure 1:
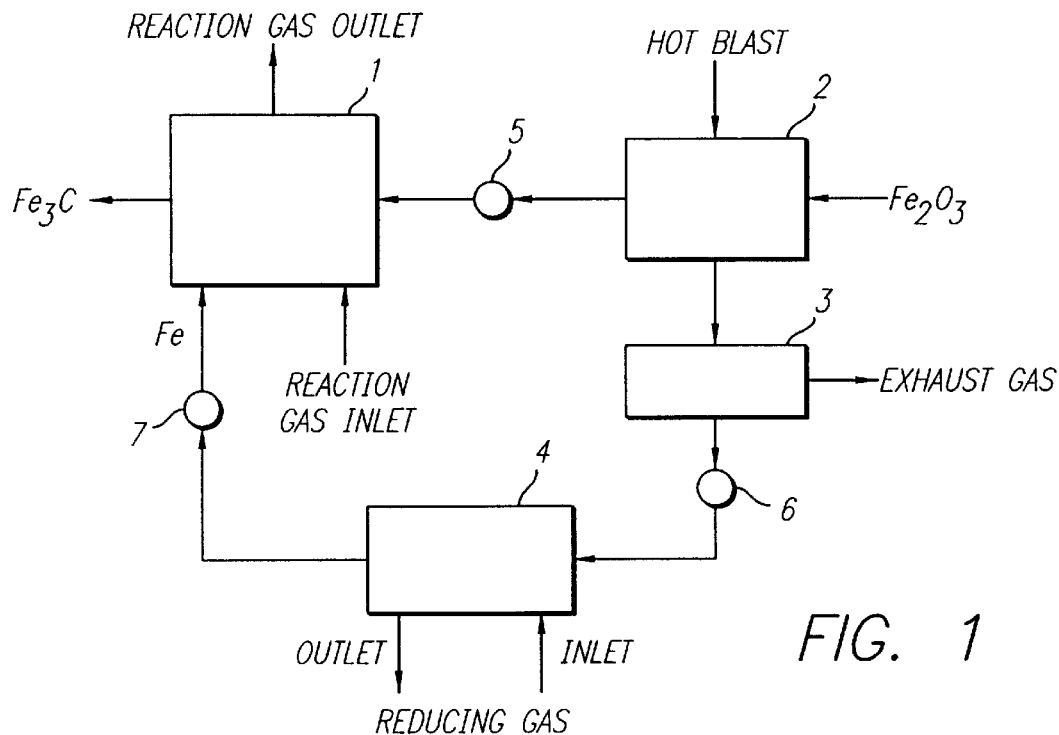
FIG. 1 is a block diagram schematically illustrating one embodiment of the invention.

Referring to the drawings, FIG. 1 schematically illustrates one embodiment of an iron carbide-producing equipment of the invention. Particles of hematite ($Fe_2O_3$) are fed into a fluidized bed reactor 1 as a starting material for the carburizing reaction to obtain particles of iron carbide ($Fe_3C$). The hematite fed to reactor 1 is powdered ore that has been preheated by a blast of hot gas in a preheating furnace 2. The operating conditions in preheating furnace 2 and fluidized bed reactor 1 are similar to the conditions disclosed in the above-mentioned prior art. For example, the preheating step is performed at a temperature of 500° C. to 900° C. by hot blast such that the reaction in fluidized bed reactor 1 is carried out at a temperature above 500° C.

The hot blast gas which preheats the ore in preheating furnace 2 is discharged as an exhaust gas and directed into a dust catcher 3. The preheated coarse ore is directed into fluidized bed reactor 1 through lock hopper 5, and the preheated minute ore which an exhaust gas contains is collected by dust catcher 3. In dust catcher 3, minute iron oxide particles are separated from the exhaust gas by a cyclone or similar separator. The minute particles are iron oxide particles contained in the starting material. Dust catcher 3, therefore, acts as a recovering means for recovering minute particles of iron oxide from the exhaust gas. The recovered iron oxide particles are fed into a reducing furnace 4, which acts as a reducing means. In reducing furnace 4, the iron oxide is reduced by a reducing gas, containing hydrogen ($H_2$) or a similar gas, to obtain iron particles (Fe). The iron particles produced in reducing furnace 4 are introduced near the middle of the flow path through fluidized bed reactor 1, or downstream therefrom.

Fluidized bed reactor 1 fluidizes the preheated particles of iron oxide with a reaction gas and carburizes the particles while moving the particles along the inside passage thereof, or flow path, to convert the iron oxide particles into iron carbide particles. The reaction proceeds along the passage, or flow path, and the carburizing reaction is promoted by adding iron particles to fluidized bed reactor 1 near the middle of the flow path, or downstream thereof. Introduction at this point corresponds to the latter part of the reaction, thereby increasing the production rate during the latter part of the reaction. Since different atmospheres are used in fluidized bed reactor 1, preheating furnace 2, and reducing furnace 4, respectively, lock hoppers 5, 6, and 7 are positioned between reactor 1 and preheating furnace 2 and reducing furnace 4 to prevent the atmospheres from mixing with each other. In each lock hopper 5, 6 or 7, the solid particles passing therethrough are stored temporarily and nitrogen gas ($N_2$) or the like is substituted for the atmosphere, then the reaction gas used in reactor 1 is substituted for the inert gas.

It is theorized that adding the iron particles to the flow path of fluidized bed reactor 1 promotes a decomposition of carbon monoxide (CO) contained in the reaction gas by the following reaction:

$$2CO \rightarrow C + CO_2$$

Such a catalytic effect is reported, for instance, in Metallurgical Transactions, Volume 5, January, 1974, pp. 11–25. According to FIG. 6, the production rate of iron carbide is theorized to be decreased in the latter part of the reaction because of the low percent of iron (Fe) that is present. Adding iron to act as a catalyst in the latter part of the reaction increased the production rate of iron carbide.

Figure 2:
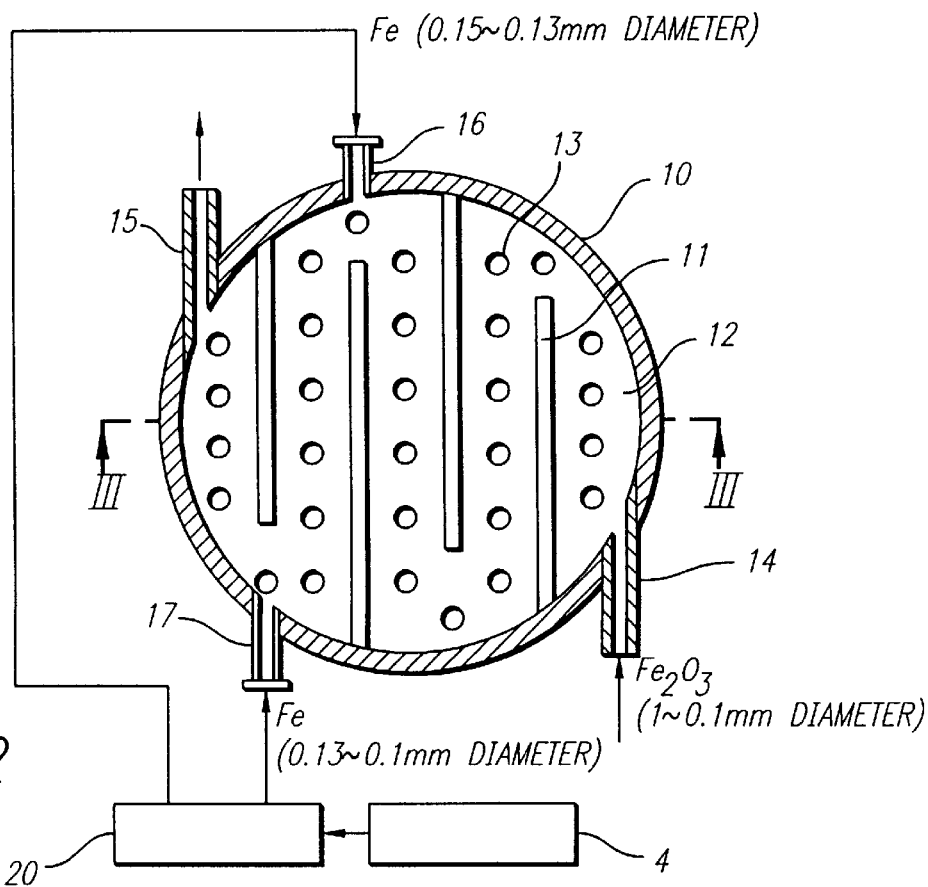
FIG. 2 is a schematic horizontal sectional view of another embodiment of an equipment of the invention.
Figure 3:
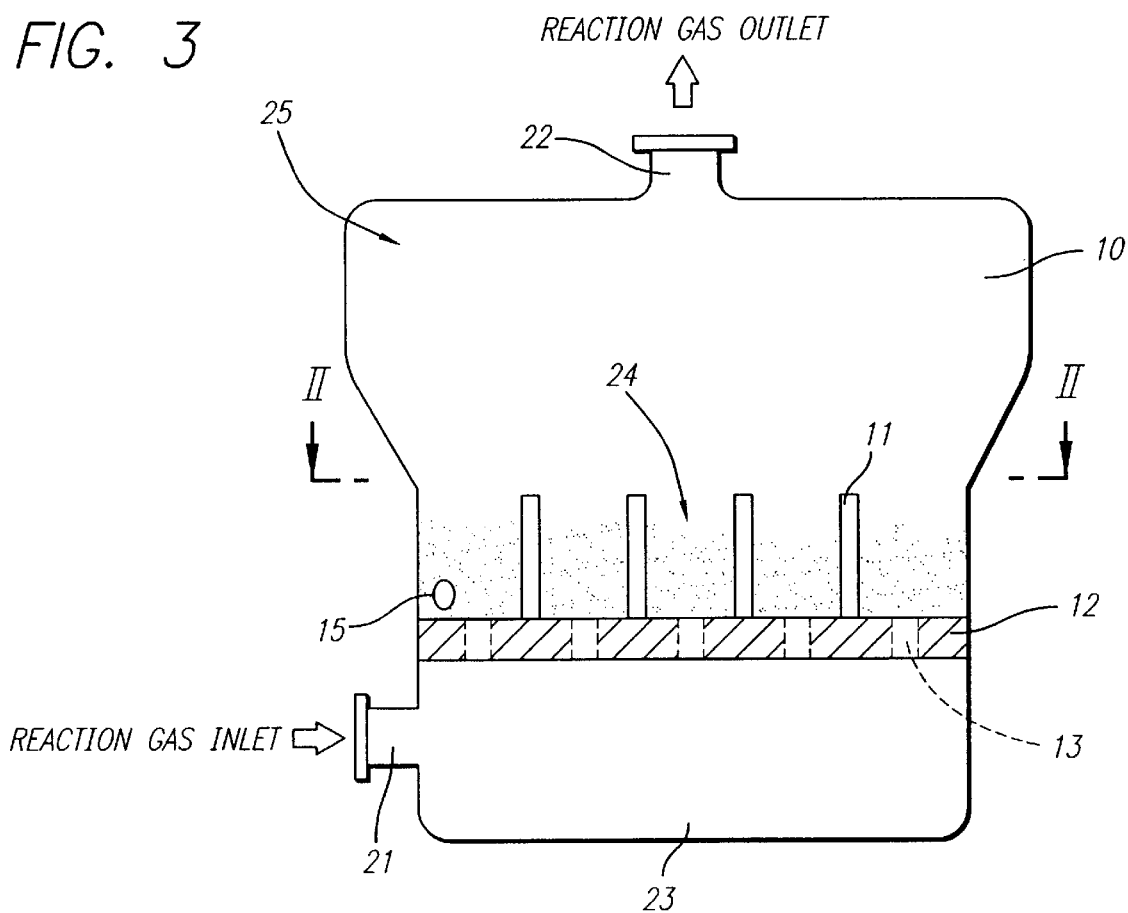
FIG. 3 is a schematical elevational view in section of the equipment of the embodiment of FIG. 2.
Figure 6:
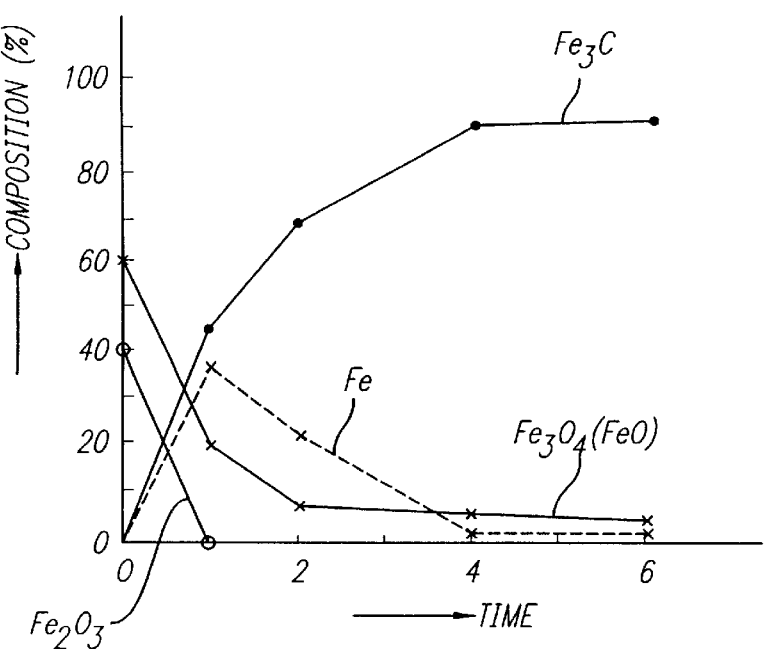
FIG. 6 is a graph illustrating the relation between the reaction time and the composition of the reaction mixture using a prior art process and equipment therefor.

FIG. 2 and FIG. 3 schematically illustrate another embodiment of an equipment of the invention. FIG. 2 is a horizontal sectional view taken on line II—II of FIG. 3, and FIG. 3 is an elevational view in section taken on line III—III of FIG. 2. A fluidized bed reactor 10 of the embodiment having a cylindrical shape, which is advantageous as a pressure vessel, is divided inside by dividers 11 to elongate the passage. A fluidized bed is fluidized by reaction gas jetted from nozzles 13 provided on a distributor 12. The passage, or flow path, of the fluidized bed is defined between a feeding port 14 for iron oxide particles and an exhaust port 15 for iron carbide particles, wherein the iron oxide particles are being carburized by the reaction gas while being moved along the flow path by the reaction gas. Iron is produced in fluidized bed reactor 10 immediately after feeding the iron oxide starting material, as shown in FIG. 6, and the production of iron promotes the reaction which produces iron carbide. However, in the latter part of the reaction, the decrease in iron (Fe) content leads to a decline in the catalytic action. In the embodiment, a plurality of inlets 16 and 17 are provided in the latter part of the passage so that iron particles can be added through the inlets at locations along the length of the flow path.

The iron particles added through inlets 16 and 17 are obtained by reducing recovered iron oxide particles in reducing furnace 4, then classifying the iron particles into several classes based on a diameter of the particles by a classifier 20, such as a cyclone or the like. For example, if the particles of hematite ($Fe_2O_3$) fed from feeding port 14 are 0.1 to 1 mm in diameter, the recovered and reduced iron (Fe) particles will be 0.1 to 0.15 mm in diameter by means of an adequate design, and classifier 20 will classify the iron (Fe) particles into a class of Fe particles 0.13 to 0.15 mm in diameter and a class of Fe particles 0.1 to 0.13 mm in diameter, wherein the particles of the smaller diameter class are introduced to reactor 10 through inlet 17. The iron particles of smaller diameter preferably are added to reactor 10 through a downstream side inlet 17, which is nearer to exhaust port 15 at the end of the flow path, as opposed to through relatively upstream side inlet 16, such that the iron particles can effectively act as a catalyst, even in a short time period, and then be converted into iron carbide.

As shown in FIG. 3, fluidized bed reactor 10 introduces a reaction gas containing carbon monoxide (CO) through a reaction gas inlet 21 at the downside of reactor 10 and discharges the reaction gas through a reaction gas outlet 22 on the top side of reactor 10. A wind box 23 for temporarily accumulating the introduced reaction gas is defined below a distributor 12 and the reaction gas in wind box part 23 is jetted through nozzles 13 provided on distributor 12 to form a fluidized bed 24 above distributor 12. Dividers 11 extend higher than the top of the formed fluidized bed 24. The upper side wind tower 25 has sufficiently large sectional area such that the velocity of the flowing reaction gas is reduced, preventing said particles from scattering over dividers 11 and out of the fluidized bed 24.

Figure 4:
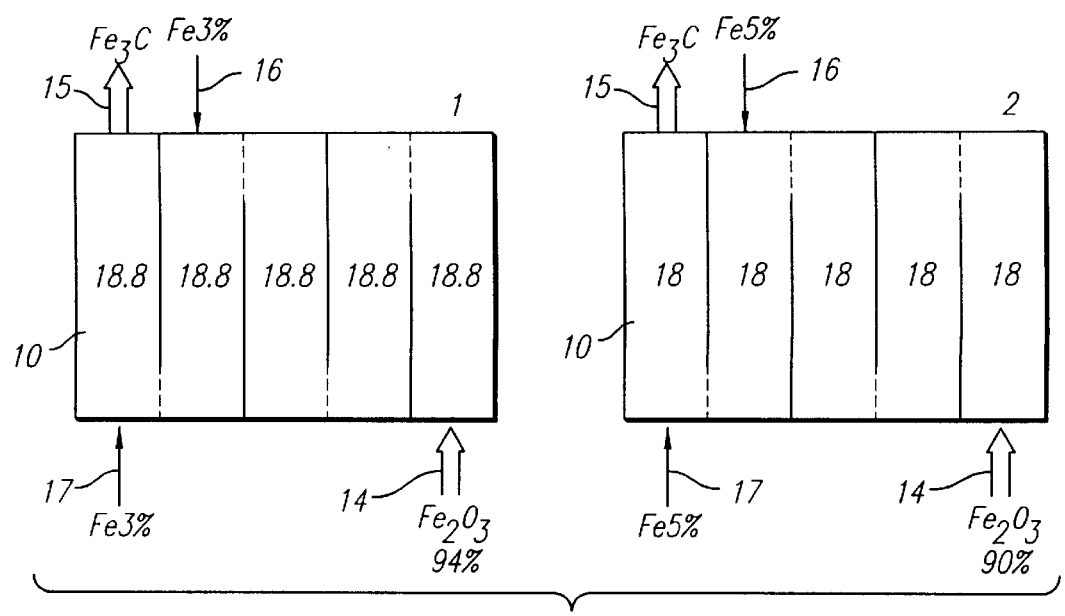
FIG. 4 is a nonlimiting example of operating conditions used in the equipment of the embodiment of FIG. 2.

FIG. 4 illustrates nonlimiting operating conditions with respect to the amount of $Fe_2O_3$ fed as a starting material and the amount of Fe subsequently added to fluidized bed reactor 10. The percentages of Fe input are 6%, by weight, in FIG. 4(1) and 10% in FIG. 4(2). Because the inside of fluidized bed reactor 10 is a flow path, the length of which is divided into five spaces, the percent of added Fe in each space are as follows:

$$\frac{6/2}{18.8} \times 100 = 16 \ (\%), \text{ for FIG. 4} \tag{1}$$

$$\frac{10/2}{18} \times 100 = 28 \ (\%), \text{ for FIG. 4} \tag{2}$$

The percent of added Fe preferably is between 10% and 50%.

Figure 5:
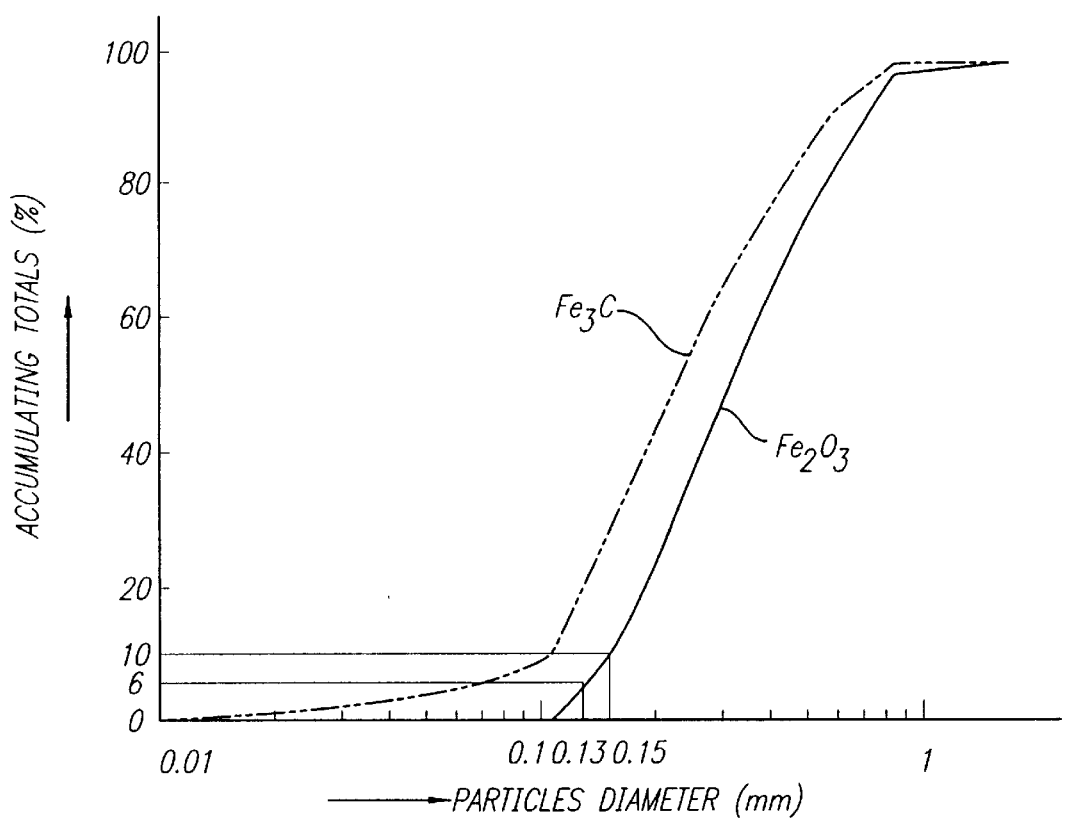
FIG. 5 is a graph illustrating the particle size distribution of the iron oxide particles and the iron carbide particles.

FIG. 5 illustrates the particle size distribution of $Fe_2O_3$ fed as a starting material as the solid line, and the particle size distribution of the iron carbide produced therefrom as the two-dotted line. $Fe_2O_3$ particles are distributed between 0.1 and 1 mm, and if 10% of the total amount of $Fe_2O_3$ is required, then the 0.15 mm or smaller particles of $Fe_2O_3$ can be recovered and reduced for addition as the iron particles. If 6% of the total amount of $Fe_2O_3$ is required, then the 0.13 mm or smaller particles of $Fe_2O_3$ can be recovered and reduced for addition as iron particles.

In each embodiment of the invention disclosed above, the iron particles added into the fluidize bed reactor are produced by reducing a portion of the iron oxide particles fed as a starting material. However, the iron particles independently produced also can be used to catalyze the conversion of iron oxide to $Fe_3C$. In accordance with the above-disclosed embodiments, the use of the freshly produced iron particles is preferred because such particles are less oxidized, thereby approximating pure iron, such that the iron particles can completely act as catalyst, in small amounts, to efficiently produce iron carbide.

INDUSTRIAL APPLICABILITY

As set forth hereinabove, the present invention is adequate to an equipment for increasing the production rate of iron carbide in the latter part of the reaction, and thereby efficiently producing iron carbide without increasing the size of the fluidized bed reactor.

We claim:

1. A process for producing iron carbide comprising introducing iron oxide particles into a fluidized bed reactor, fluidizing the iron oxide particles with a reaction gas, and carburizing the iron oxide particles to iron carbide along a flow path in the reactor, wherein iron particles are introduced to the middle of the flow path of the iron oxide particles through the reactor, or downstream therefrom.

2. The process of claim 1, wherein the iron particles are added at a plurality of locations along the flow path, and wherein the average particle size of the iron particles added at a relatively downstream side of the flow path is smaller than the average particle size of the iron particles added at a relatively upstream side of the flow path.

3. The process of claim 1, wherein prior to fluidizing said iron oxide particles with said reaction gas said iron oxide particles are preheated with a hot gas, the larger preheated iron oxide particles are introduced into said fluidized bed reactor and the smaller preheated iron oxide particles are recovered from the hot gas and introduced to a reducing furnace and reduced to iron particles.

4. The process of claim 2, wherein prior to fluidizing said iron oxide particles with said reaction gas said iron oxide particles are preheated with a hot gas, the larger preheated iron oxide particles are introduced into said fluidized bed reactor and the smaller preheated iron oxide particles are recovered from the hot gas and introduced to a reducing furnace and reduced to iron particles.

* * * * *